United States Patent [19]  
Nishizako et al.

[11] 4,436,831  
[45] Mar. 13, 1984

[54] CALCINED MEMBER FOR ARC-EXTINGUISHING CHAMBERS

[75] Inventors: Shizutaka Nishizako, Tajimi; Isao Ishii, Amagasaki; Yoshiaki Sakamoto, Suita, all of Japan

[73] Assignee: Mitsubishi Denki Kabushiki Kaisha, Tokyo, Japan

[21] Appl. No.: 398,695

[22] Filed: Jul. 15, 1982

[30] Foreign Application Priority Data

Jul. 15, 1981 [JP] Japan ................................. 56-110381

[51] Int. Cl.³ ....................... C04B 35/04; C04B 35/18
[52] U.S. Cl. ............................... 501/119; 106/DIG. 3; 200/144 C; 200/149 A; 501/112
[58] Field of Search ...................... 501/112, 119, 121; 106/DIG. 3; 200/144 C, 149 A

[56] References Cited

U.S. PATENT DOCUMENTS 2,768,264 10/1956 Jones et al. .......................... 501/121
2,864,919 12/1958 Stringfellow .................... 200/144 C
2,950,371 8/1960 Stringfellow .................... 200/144 C Primary Examiner—Mark Bell  
Attorney, Agent, or Firm—Wenderoth, Lind & Ponack

[57] ABSTRACT

A calcined member for arc-extinguishing chambers which are installed in electromagnetic contactors and magnetic circuit breakers for high-voltage applications. The calcined member consists of an inorganic composite material obtained by molding and heat-treating a starting material under pressurized condition, the starting material comprising 10 to 50% by weight of a mica powder as a base material, 10 to 50% by weight of a magnesium oxide as a charging material, and 25 to 60% by weight of a mixture powder of boric acid, boric anhydride and zinc oxide as a binder.

10 Claims, 8 Drawing Figures

CALCINED MEMBER FOR ARC-EXTINGUISHING CHAMBERS

BACKGROUND OF THE INVENTION

The present invention relates to a calcined member for arc-extinguishing chambers that are employed for electromagnetic contactors for high-voltage applications and for electromagnetic circuit breakers.

In the conventional arc-extinguishing chambers employed for high-voltage electromagnetic contactors and electromagnetic circuit breakers which break heavy currents of high voltages, it is accepted practice to provide the arcing path with separator walls maintaining a suitable distance, i.e., to form an arcing labyrinth in order to lengthen the arc that takes place between the contacts. Grids are often used to form the arcing labyrinth as shown in FIGS. 1, 2 and 3. In the drawings, reference numeral 1 denotes a plurality of grids each having a nearly V-shaped groove 2 that runs from the lower end toward the higher direction and that is deviated toward one direction as illustrated in detail in FIG. 3(a). The grids are arrayed maintaining a predetermined distance as shown in FIG. 1, in such a manner that the V-shaped grooves 2 are disposed in a zig-zag manner to form an arcing labyrinth as shown in FIG. 3(b). The grid 1 is usually made of a porcelain-type material which is obtained by molding a powder of zircon porcelain, zircon-cordierite porcelain or alumina porcelain, followed by calcining in a kiln heated at 1100° to 1400° C. for about 24 hours. Reference numerals 4, 4' denote arc horns, and 5, 5' denote splitters to which the arc horns 4, 4' are fastened by screws. Like the grids 1, the splitters are made of a porcelain such as zircon porcelain or zircon-cordierite porcelain which has increased resistance against the heat and arc. The splitters 5, 5' also serve as side plates. Reference numerals 6, 6' denote stepped portions formed in the splitters 5, 5' so as to form a ceiling for the ends of the arc horns 4, 4'. Reference numeral 7 denotes a deflector plate, 8 and 8' denote shields, and 9 and 9' denote a pair of side plates.

In the thus constructed arc-extinguishing chamber, the arc which develops across the contactors (not shown) travels to a position of between the arc horn 4 and the arc horn 4'. Here due to the function of magnetic flux and current generated by a blow-out coil, the arc travels upwards from the position A–A' to the position B–B' in FIG. 1. Therefore, the arc is lengthened and is quenched through the arcing labyrinth formed by the grids 1. As the arc reaches the ends of the arc horns 4, 4', feet of the arc come into contact with the stepped portions 6, 6' and are temporarily interrupted from moving upwards. In this case, the central portion of the arc belches out of the arc-extinguishing chamber being divided into two by the deflector plate 7. Therefore, the arc is further lengthened as indicated by C–C' in FIG. 1. Since the feet of arc have been stopped at the ends of the arc horns 4, 4', however, the arc is sufficiently quenched by the splitters 5, 5' which have increased resistance against the heat and is extinguished before it comes out of the arc-extinguishing chamber. The arc is thus extinguished.

Grids 1 which form the arcing labyrinth are usually constructed in the below-mentioned two manners.

One method consists of using grids 1 of flat plates of FIG. 3(a) as mentioned already, arraying them alternatingly as shown in FIG. 3(b), and stuffing an inorganic material such as asbestos-type material 10 among the grids 1 to eliminate clearance. According to this method, however, tremendous amount of labor, extended periods of time and increased manufacturing costs are required, inviting a defect of decreased insulation as a result of sucking the moisture. Further, the grids 1 must be calcined in a kiln heated at 1100° to 1400° C. for 24 hours. Therefore, distortion or warping tends to develop on a plane of the grids. Further, the grids have small resistance against impact, and are often broken during the assembling operation, or during the transportation and checking.

Another method consists of using grids 1 which have side plates 3, 3' on both sides as shown in FIG. 4(a), and combining them as shown in FIG. 4(b). Even in this case, the arc belches through the side plates 3. 3' of grids 1 in the X and Y directions. Therefore, belching of arc must be prevented by using an expensive inorganic material such as mica or zircon porcelain (asbestos is not used since it has poor hygroscopic property). Further, the grids 1 are often warped, or broken during the operations of assembling, transportation and checking, since they are made of a zircon porcelain, zircon-cordierite porcelain or alumina porcelain, through the step of calcining at 1100° to 1400° C. for more than 24 hours.

As mentioned above, the procelain-type material produces very little gas when it is used as an arc-resistant material and, hence, does not exhibit the function to extinguish the arc by the gas. The porcelain-type material, however, exhibits excellent resistance against high temperatures, exhibits very high insulation resistance on the arcing surface under high-temperature conditions, and exhibits increased arc-resistant property. Therefore, the porcelain-type materials have heretofore been extensively used for grids for arc-extinguishing chambers and for arc-extinguishing side plates. The porcelain-type materials, however, have poor moldability and poor dimensional precision, and are subject to be damaged upon receipt of mechanical impact and vibration.

SUMMARY OF THE INVENTION

In order to preclude the defects inherent in the above-mentioned conventional materials, the present invention provides a novel calcined member for arc-extinguishing chambers, which consists of an inorganic composite insulating material which is obtained by molding and heat-treating a starting material under pressurized condition, said starting material comprising 10 to 50% by weight of a mica powder as a base material, 10 to 50% by weight of a magnesium oxide as a charging material, and 25 to 60% by weight of a mixture powder of boric acid, boric anhydride and zinc oxide as a binder.

BRIEF DESCRIPTION OF THE DRAWINGS

In the drawings, the same reference numerals denote the same or corresponding portions.

DESCRIPTION OF THE PREFERRED EMBODIMENTS

Figure 5A:
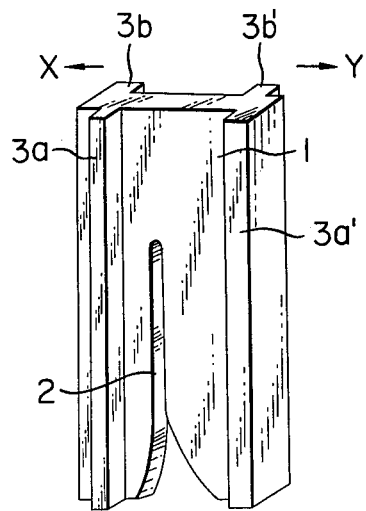
FIG. 5(a) is a perspective view of a grid according to an embodiment of the present invention.
Figure 5B:
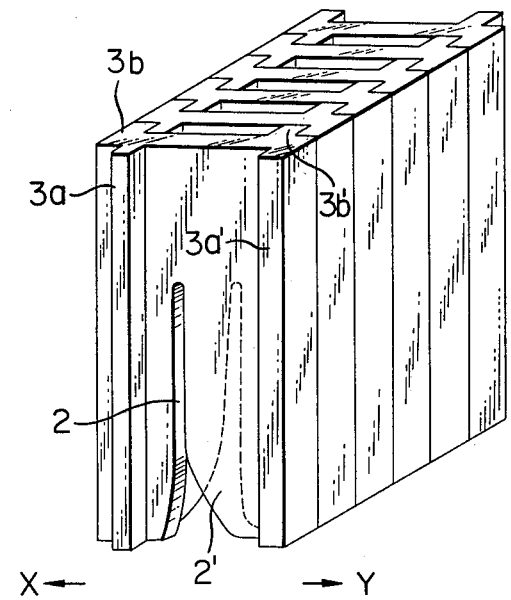
FIG. 5(b) is a perspective view showing a laminate of grids of FIG. 5(a).

A grid will be described below according to an embodiment of the present invention. In FIG. 5(a), protruded edges 3a, 3a' are formed on both sides of a grid 1, and protruded edges 3b, 3b' are also formed to be symmetrical thereto. The grids 1 are stacked such that nearly V-shaped grooves 2 are located in a zig-zag manner thereby to form an arcing labyrinth as shown in FIG. 5(b). Thus, the protruded edges 3a, 3a', 3b, 3b' formed on both sides of the grids 1 come into intimate contact with each other, the stacked edges being doubled. Therefore, the arcing labyrinth is covered in a doubled manner, and the arc is prevented from belching out in the X and Y directions.

As a base material for constructing the above-mentioned grids 1, use is made of a mica powder which is a flake-like substance, which exhibits excellent electric insulation and excellent withstand voltage, which forms a laminate when it is molded under pressurized condition with other materials sandwitched in it, and which serves as a reinforcing material and as a packing material. As a charging material, use is made of a magnesium oxide powder which is a high-melting material, which exhibits a high resistance at high temperatures, and which provides excellent arc-resistant property. As a binder, furthermore, use is made of a mixture powder consisting of boric acid that generates evaporating substance such as water vapor upon thermal decomposition and that exhibits bonding force when it is heated, boric anhydride which exhibits bonding force when it chemically catches water produced by the boric acid and is modified, and zinc oxide which stabilizes the characteristics of the thermally decomposed products of boric acid and boric anhydride. Thus, the mica powder, magnesium oxide and mixture powder are used as starting materials. A mixture of these starting materials is molded under the heated and pressurized conditions and is treated with heat to prepare an inorganic composite insulating material. This material exhibits arc-resistant property, mechanical strength and dimensional precision which are required for the grids for arc-extinguishing chambers, and further exhibits excellent heat-resistant property, insulating property, and property of being machined.

As for the composition of the starting materials used for preparing the grids, the base material is used in an amount of 10 to 50% by weight (hereinafter, percent is all by weight), and preferably in an amount of 20 to 40%. With the amount being smaller than 10%, the mechanical strength and insulating property are deteriorated. With the amount being greater than 50%, the ratio of the charging material becomes small, and arc-resistant property is deteriorated.

The charging material is used in an amount of 10 to 50% and, preferably in an amount of 20 to 40%. With the amount being smaller than 10%, the arc-resistant property decreases. With the amount being greater than 50%, on the other hand, the blending ratio of the base material becomes small and, hence, the mechanical strength decreases, and the material becomes hard and loses processability.

The bonding material is used in an amount of 25 to 60% and, preferably in an amount of 30 to 50%. With the amount being smaller than 25%, it is not capable of firmly bonding other starting materials, and the water-resistant property is deteriorated. With the amount being greater than 60%, blending ratios of the base material and charging material are reduced, to lose mechanical strength and arc-resistant property.

As for the composition of the bonding material, boric acid should be used in an amount of 20 to 60 parts, preferably 30 to 50 parts, boric anhydride should be used in an amount of 5 to 30 parts, preferably 10 to 25 parts, and zinc oxide should be used in an amount of 30 to 60 parts, preferably in an amount of 35 to 50 parts. The parts being based on 100 total parts by weight of binder. With the amount of boric acid being less than 20 parts, the bonding force is not sufficiently exhibited. With the amount of boric acid being greater than 60 parts, on the other hand, water-resistant property and moisture-resistant property are lost.

An embodiment of the invention will be described below in detail.

Example 1

240 Grams of a powder of starting material is prepared by mixing, using a mixer, 30 parts of natural phlogopite powder having particle sizes over a range of 60 to 140 mesh as a base material, 30 parts of a powder of electrofused magnesium oxide having particle sizes over a range of 60 to 100 mesh as a charging material, and 40 parts of a mixture powder which serves as a binder and which consists of 40 parts of particulate boric acid, 15 parts of boric anhydride and 45 parts of fine zinc oxide particles, all having particle sizes over a range of 100 to 300 mesh. The powder of starting material is charged into a metal mold which is heated at a temperature of 170° to 180° C. and is maintained for 20 minutes under a pressure of 150 to 200 kg/cm². The heating is then discontinued, and the metal mold is immediately cooled. When the temperature dropped to 70° C., the pressure is released, and the molded product is taken out. The product is then heat-treated at 200° C. for 4 hours to prepare a grid for arc-extinguishing chambers.

Example 2

270 Grams of a powder of starting material having a composition of 10 parts of the base material, 50 parts of the charging material and 40 parts of the binder, is prepared using the same materials as those of Example 1, in order to prepare a grid for arc-extinguishing chambers in the same manner as in Example 1.

Example 3

200 Grams of a powder of starting material having a composition of 50 parts of the base material, 10 parts of the charging material and 40 parts of the binder, is prepared using the same materials as those of Example 1, in order to prepare a grid for arc-extinguishing chambers in the same manner as in Example 1.

Example 4

250 Grams of a powder of starting material is prepared by mixing, using a mixer, 40 parts of natural phlogopite powder having particle sizes over a range of 48 to 100 mesh as a base material, 30 parts of a powder of electrofused magnesium oxide having particle sizes over a range of 50 to 140 mesh as a charging material, and 30 parts of a mixture powder which serves as a binder and which consists of 46 parts of particulate boric acid, 10 parts of boric anhydride and 44 parts of fine zinc oxide particles, all having particle sizes over a range of 100 to 300 mesh. Using the powder of starting material, a grid for arc-extinguishing chambers is prepared by the same moding method as Example 1.

Grids prepared according to the above-mentioned Examples 1 to 4 were stacked to constitute arc-extinguishing chambers. The chambers were incorporated into high-voltage electromagnetic contactors and were subjected to the test of breaking capacity under the conditions of a voltage of 3500 volts and a current of 8000 amperes. Good circuit-breaking performance was exhibited in all cases; i.e., arc did not belch out to cause re-arcing or short-circuiting. Small lusterless particles had been formed in small amount on the arcing surfaces, and the degree of damage was very small. Further, the grids were not damaged by the shock of thermal energy. Further, unlike the conventional grids made of a porcelain-type material, the grids prepared according to the present invention were not broken when they were assembled or transported. Moreover, because of good dimensional precision, stacking of the grids did not involve any difficulty.

The grids for arc-extinguishing chambers according to the present invention exhibit excellent characteristics because the electrofused magnesium which serves as a charging material prevents the mica substrate and the boric acid-type binder from converted into eutectic vitrified state even when they are touched by the arc, but permits them to be converted into crystals. Therefore, the grids exhibit very high resistance at high temperatures and, hence, exhibit increased arc impedance, so that the chamber exhibits excellent resistance against the arcing as well as effective arc-extinguishing function. In case a vitreous substance (non-crystalline substance) is precipitated on the arcing surfaces, fine particles of molten metals from the electrodes and arc hours may fly and adhere upon them when the circuit is broken, so that the surface resistivity decreases. Or, metal oxides may be melted to further decrease the viscosity of the vitreous material, so that the insulation resistance decreases. When the arcing surface consists of a crystalline material, metal particles adhere in small amounts and the surface is not melted, and the resistance does not decrease, eliminating the probability of restriking of arc. With regard to the mechanical strength and warping, the present invention employs flake-like mica powder for the base material. The mica powder is alternatingly laminated via the charging material and binder under the elevated pressure condition so as to work as a reinforcing material and as a packing material. Therefore, the grids are strong against mechanical impact and vibration, and exhibit good withstand voltage.

In addition to the electrofused magnesium oxide, sintered magnesium oxide or baked magnesium oxide may be used as the charging material in the embodiment of the present invention to exhibit sufficient effects. In regard to the reaction with the binder under the heated and compressed condition and in regard to the density of the product, however, the electrofused magnesium oxide is best suited.

Further, although natural phlogopite is used as the mica substrate, it is allowable to use natural muscovite or synthetic mica as a material for preparing grids of arc-extinguishing chambers.

According to the present invention, a mixture powder consisting of boric acid, boric anhydride and zinc oxide, is used as a binder. When the mixture powder is heated under elevated pressure condition, water content produced by the thermal decomposition of boric acid is chemically captured by the boric anhydride. Therefore, the boric anhydride is modified and is reacted with zinc oxide that serves as a stabilizer and is, hence, converted into stable boron compound which exhibits rich bonding property to completely bond the base material and added materials together.

The same effects can be exhibited even when calcium oxide is used instead of zinc oxide. Calcium oxide, however, exhibits strong alkalinity, and requires clumsy operation for producing grids. It is therefore desired to use zinc oxide.

Characteristics of the conventional zircon-cordierite procelain are compared below with characteristics of the materials of the present invention.

TABLE

| Material | Characteristics | | | |
|---|---|---|---|---|
| | Arc-resistant Property (sec) (JISK6911) | Charpy impact strength (kgf.cm/cm$^2$) (JISK6911) | Bending strength (kg/mm$^2$) (JISK6911) | Dielectric Breakdown voltage (KV/mm) (JISK6911) |
| Example 1 | 420< | 4.4 | 6.7 | 9.0 |
| Example 2 | 420< | 3.6 | 5.9 | 8.1 |
| Example 3 | 420< | 5.0 | 6.8 | 9.8 |
| Example 4 | 420< | 4.8 | 7.2 | 9.3 |
| Zircon-cordierite porcelain | 420< | 2.1 | 5.3 | 7.4 |

According to the present invention as mentioned above, the material for preparing grids for arc-extinguishing chambers consists of a mica powder as a base material, a powder of magnesium oxide as a charging material, and a mixture powder which works as a binder and which comprises boric acid, boric anhydride and zinc oxide. These starting materials are molded under heated and pressurized conditions to obtain molded articles maintaining good dimensional precision. Accordingly, the grids can be obtained at a low temperature (170° to 180° C.) without using asbestos which is hazardous for the health, contributing to the reduction in the requirement of energy. Furthermore, the products exhibit excellent arc-resistant property, mechanical strength, resistance against the heat, dielectric breakdown voltage, and property of being machined. By using the above-mentioned materials for preparing grids for arc-extinguishing chambers, asbestos-type material is not required for stuffing gaps, and no material is required for preventing the belching of arc, either, making it possible to reduce the assembling time, as well as to easily obtain arc-extinguishing chambers at reduced costs maintaining good sanitary environment.

Figure 1:
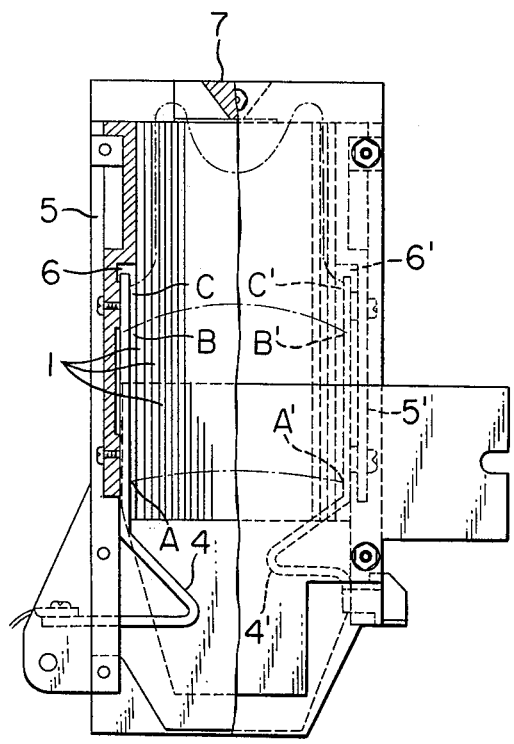
FIG. 1 is a sectional front view showing a portion of a general arc-extinguishing chamber for breaking heavy currents of high voltages.
Figure 2:
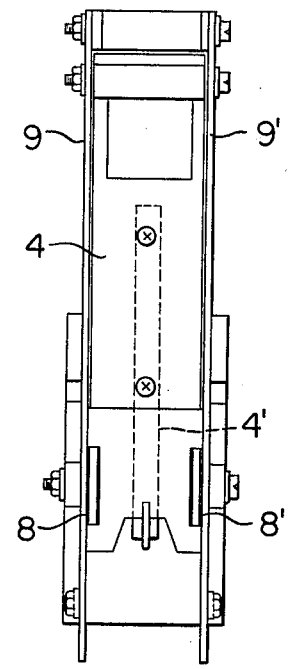
FIG. 2 is a side view of the arc-extinguishing chamber of FIG. 1.
Figure 3A:
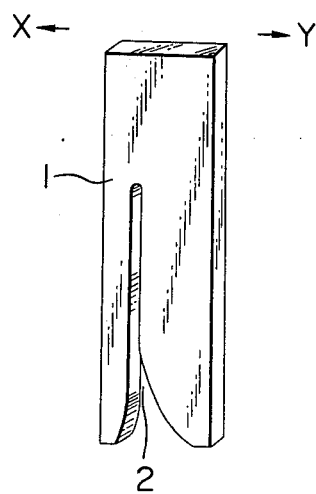
FIG. 3(a) is a perspective view of a grid that is employed for the arc-extinguishing chamber of FIG. 1.
Figure 3B:
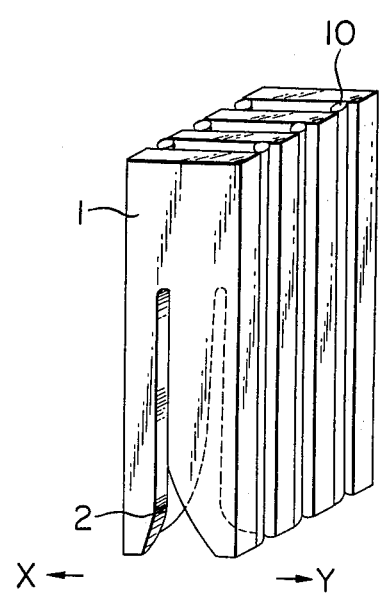
FIG. 3(b) is a perspective view showing a laminate of grids of FIG. 3(a)
Figure 4A:
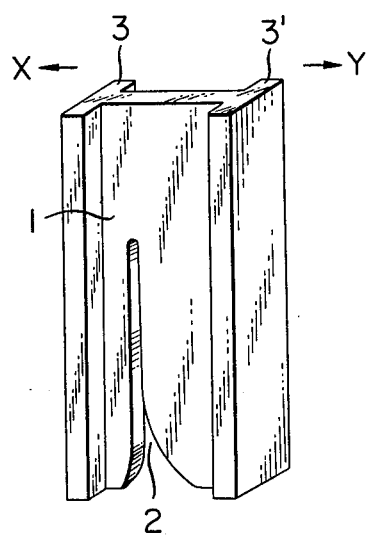
FIG. 4(a) is a perspective view of another grid that is used for the arc-extinguishing chamber of FIG. 1.
Figure 4B:
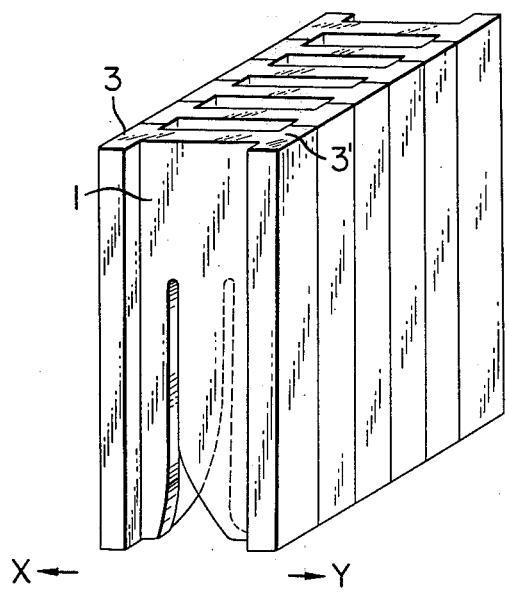
FIG. 4 is a perspective view showing a laminate of grids of FIG. 4(a)

In the foregoing was mentioned the grid of a shape shown in FIG. 5 as a first embodiment of the present invention. Here, however, the present invention can be adapted to the grids of a shape shown in FIG. 3, provided attention is not much given to labor and time required for forming grids of arc-extinguishing chambers. The present invention can further be adapted to the grids of a shape shown in FIG. 4, provided attention is not much given to the belching of arc compared with the grids of FIG. 5. In effect, the present invention can be adapted to the grids of any shape without departing from the scope of the invention in which grids are warped little owing to low calcing temperature, grids exhibit good resistance against impact, and grids are produced requiring decreased amount of energy.

The foregoing description has dealt with the case in which the invention was adapted to grids for arc-extinguishing chambers. However, the invention can, of course, be adapted to any other members for arc-extinguishing chambers such as splitters, shields and the like which had hiterto been composed of a zircon porcelain, a zircon-cordierite porcelain or an alumina porcelain.

According to the present invention as described above, a calcined member for arc-extinguishing chambers is composed of an inorganic composite insulating material which is obtained by molding and heat-treating a starting material under pressurized condition, the starting material comprising 10 to 50% by weight of a mica powder as a base material, 10 to 50% by weight of magnesium oxide as a charging material, and 25 to 60% by weight of a mixture powder of boric acid, boric anhydride and zinc oxide as a binder. Therefore, advantages are obtained such as reduced calcining temperature, reduced warping, increased impact strength, and reduced energy consumption. According to the present invention, furthermore, a calcined member for arc-extinguishing chambers is obtained featuring excellent impact strength. As secondary effects, therefore, the time required for the assembling operation can be reduced, and the calcined member can be cheaply obtained.

What is claimed is:

1. A calcined member for arc-extinguishing chambers, which consists of an inorganic composite insulation material obtained by molding and heat-treating a starting material under pressurized condition, said starting material consisting essentially of 10 to 50% by weight of a mica powder as a base material, 10 to 50% by weight of a magnesium oxide as a charging material, and 25 to 60% by weight of a binder of boric acid, boric anhydride and zinc oxide, the boric acid being present in an amount of 20 to 60 parts by weight based on 100 total parts by weight of binder.

2. A calcined member for arc-extinguishing chambers according to claim 1, wherein the amount of mica powder ranges from 20 to 40% by weight.

3. A calcined member for arc-extinguishing chambers according to claim 2, wherein the amount of magnesium oxide powder ranges from 20 to 40% by weight.

4. A calcined member for arc-extinguishing chambers according to claim 3, wherein the binder ranges from 30 to 50% by weight.

5. A calcined member for arc-extinguishing chambers according to claim 4, wherein the binder consists of 20 to 60 parts of boric acid, 5 to 30 parts of boric anhydride, and 30 to 60 parts of zinc oxide.

6. A calcined member for arc-extinguishing chambers according to claim 5, wherein the binder consists of 30 to 50 parts of boric acid, 10 to 25 parts of boric anhydride, and 35 to 50 parts of zinc oxide.

7. A calcined member for arc-extinguishing chambers according to claim 1, wherein the molding is effected at a temperature of 170° to 180° C.

8. A calcined member for arc-extinguishing chambers according to claim 7, wherein the molding is effected under the pressurized condition of 150 to 200 kg/cm$^2$.

9. A calcined member for arc-extinguishing chambers according to claim 1, wherein the mica powder which serves as a base material is at least one selected from natural phlogopite, natural muscovite and synthetic mica.

10. A calcined member for arc-extinguishing chambers according to claim 1, wherein the powder of magnesium oxide which serves as the charging material is at least one selected from electrofused magnesium oxide, sintered magnesium oxide and baked magnesium oxide.

* * * * *